Aug. 27, 1929.  H. BECKERT  1,725,896
DEVICE FOR PREVENTING THE BREAKING OF FINS IN SWIMMING SHOES
Filed March 15, 1928    6 Sheets-Sheet 1
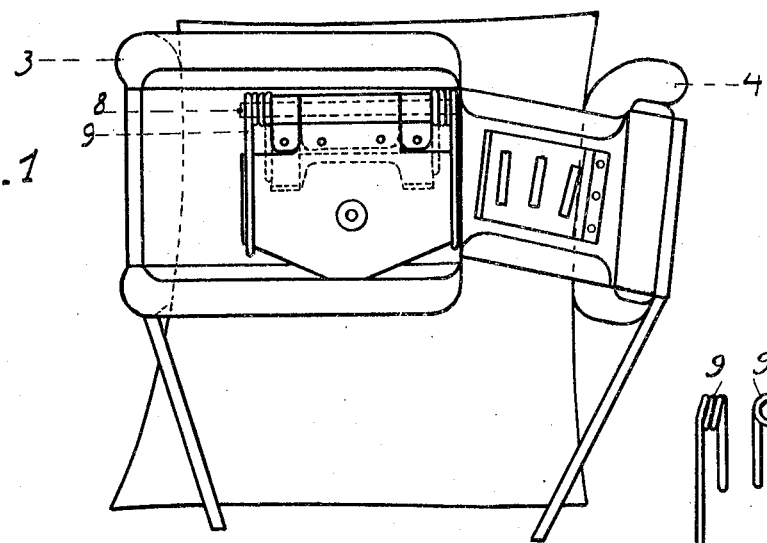
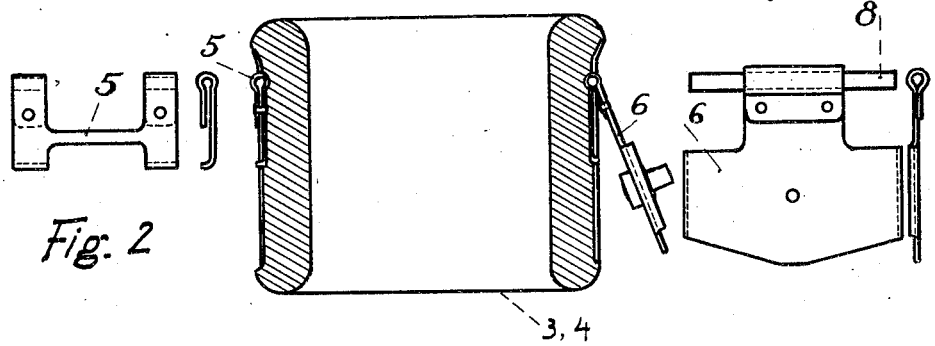
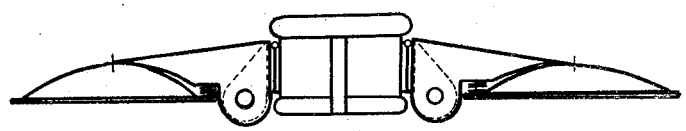
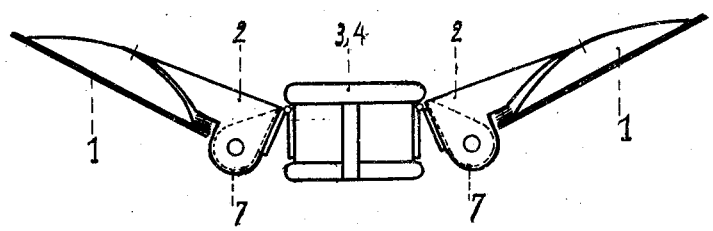
Witnesses:
Inventor:
Hans Beckert.

Aug. 27, 1929.  H. BECKERT  1,725,896
DEVICE FOR PREVENTING THE BREAKING OF FINS IN SWIMMING SHOES
Filed March 15, 1928  6 Sheets-Sheet 2
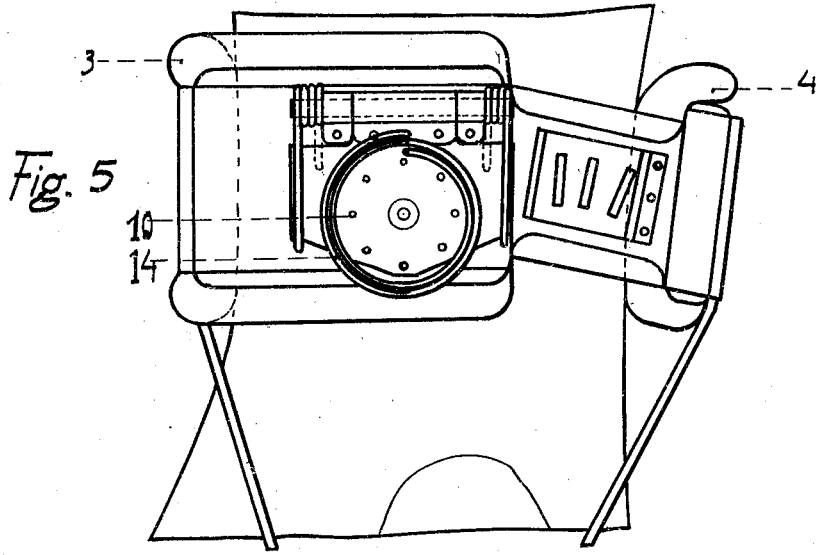
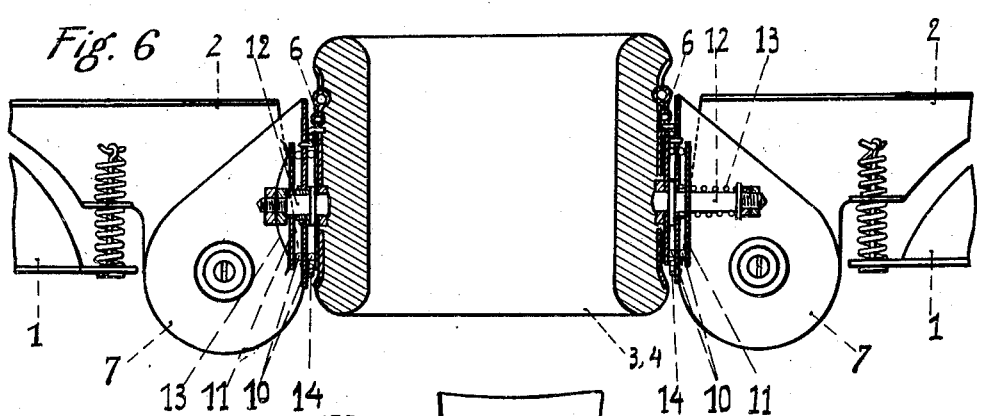
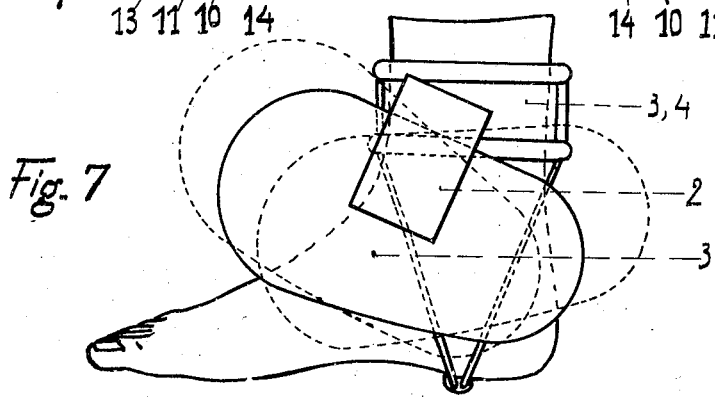
Witnesses:
Inventor:
Hans Beckert.

Aug. 27, 1929.   H. BECKERT   1,725,896
DEVICE FOR PREVENTING THE BREAKING OF FINS IN SWIMMING SHOES
Filed March 15, 1928   6 Sheets-Sheet 3

Witnesses:

Inventor:
Hans Beckert.

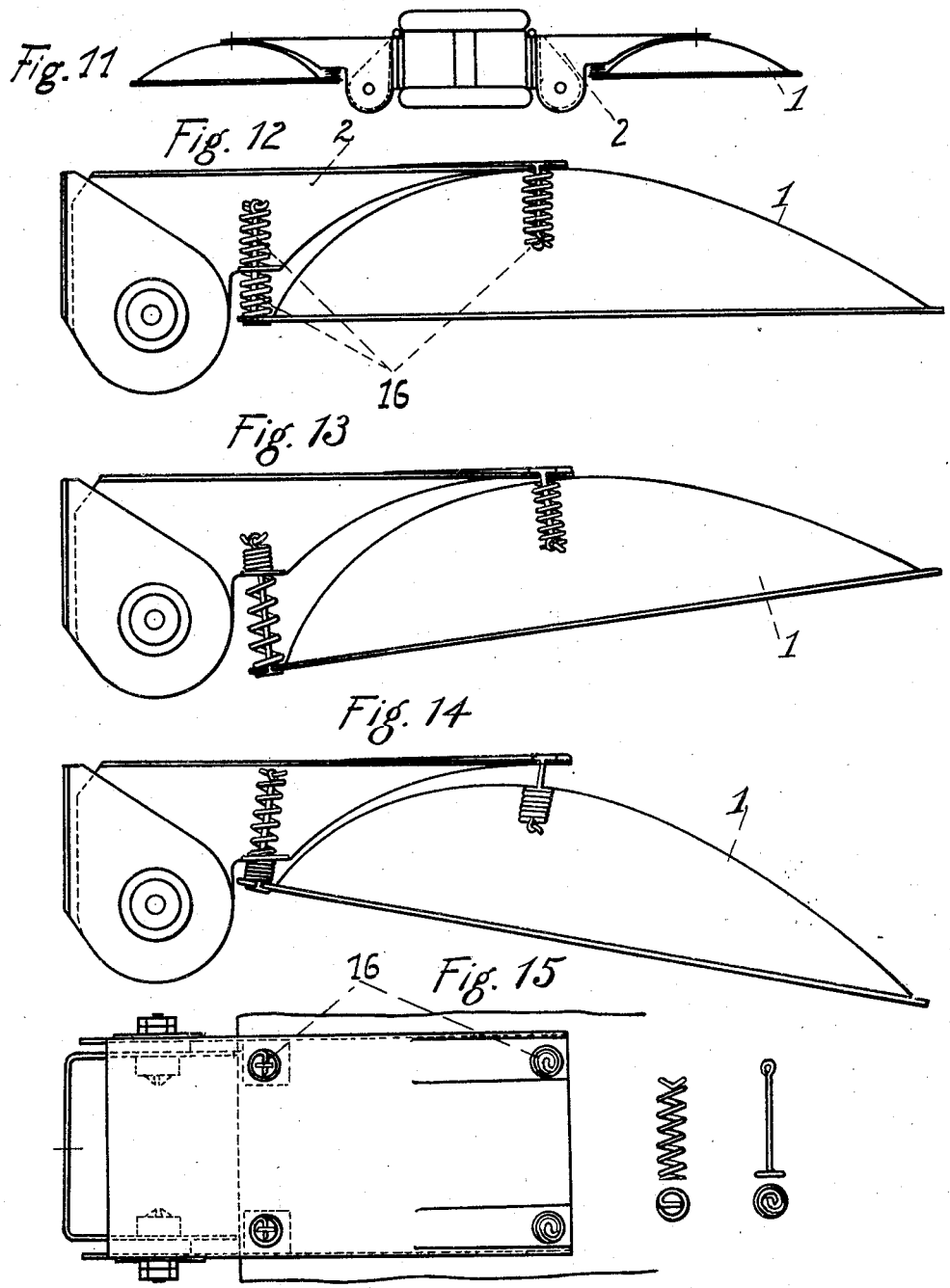

Aug. 27, 1929. H. BECKERT 1,725,896
DEVICE FOR PREVENTING THE BREAKING OF FINS IN SWIMMING SHOES
Filed March 15, 1928   6 Sheets-Sheet 6

Witnesses:

Inventor:
Hans Beckert

Patented Aug. 27, 1929.

1,725,896

UNITED STATES PATENT OFFICE.

HANS BECKERT, OF DRESDEN-LOBTAU, GERMANY.

DEVICE FOR PREVENTING THE BREAKING OF FINS IN SWIMMING SHOES.

Application filed March 15, 1928, Serial No. 261,922, and in Germany March 14, 1927.

The present invention relates to swimming appliances or swimming shoes and has for its object to provide a device for preventing the breaking of fins in swimming shoes provided with spoon-shaped fins hinged to a sleeve surrounding the ankle, the swimming shoes being generally of the type described and claimed in my co-pending application Ser. No. 240,883 of Dec. 17, 1927.

I am aware of the fact that swimming shoes of all kinds are known to the prior art, but all of them suffer from the drawback that the fins, on account of lack of mobility and elasticity, will break easily when the wearer sits or walks on the beach or swims in quiet or troubled waters, and often cause injuries to the legs of the wearer.

These drawbacks are eliminated by the present invention which embodies in the construction of the fins the same elasticity and mobility found in the nautral fin, while at the same time reducing its weight to the minimum. Furthermore, in designing the device forming the object of the invention the requirements of modern mass production were taken into consideration in order to bring the health-preserving swimming appliance described in the co-pending application within reach of the people at large, which cannot be done with the expensive, rigid, and heavy types known. Moreover, the device, unlike existing competing constructions, is absolutely foolproof.

Figure 8:
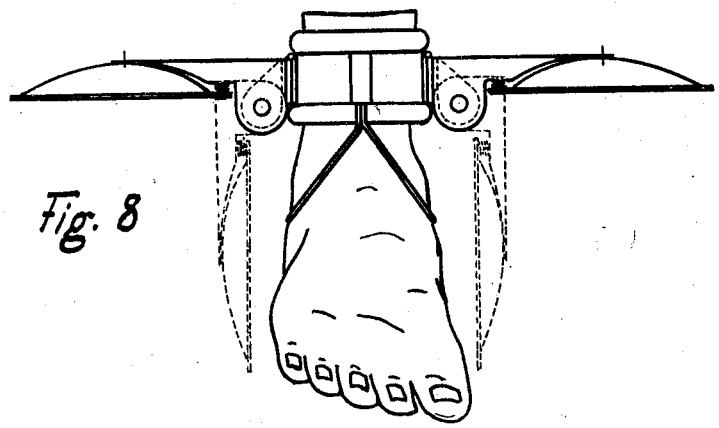
Figure 9:
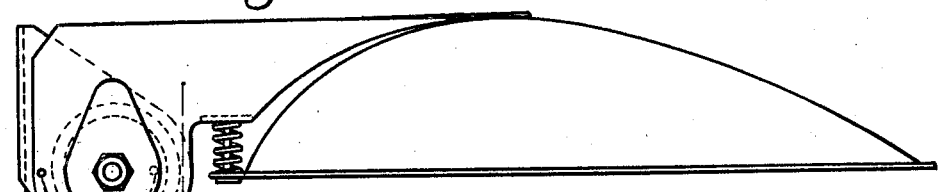
Figure 10:
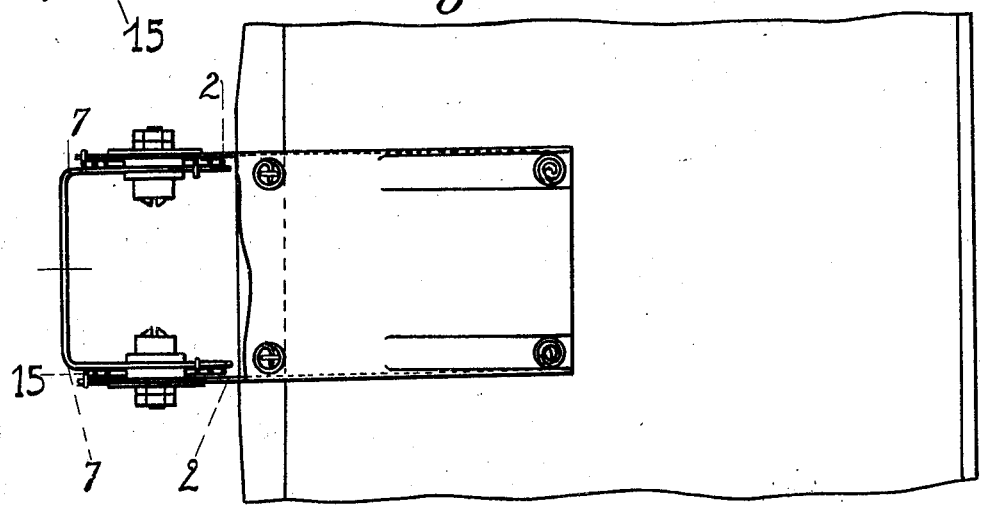
Figure 16:
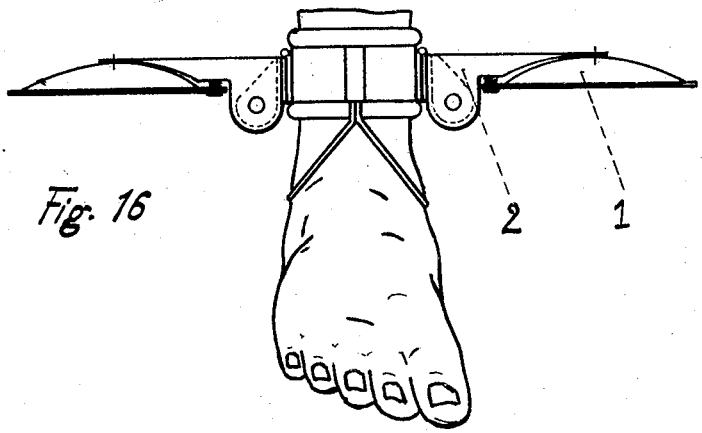
Figure 17:
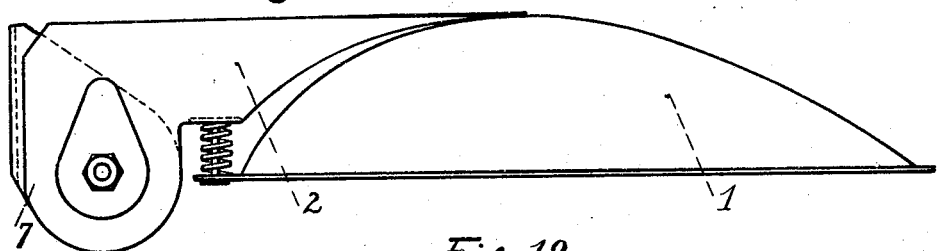

The invention is illustrated in the accompanying drawings, in which Figure 1 is a side view of a spring-actuated hinge; Fig. 2, a section of the same; Fig. 3, a front view of a pair of fins in extended position; Fig. 4, the same, showing a position preventing breakage; Fig. 5, a side view of a spring actuated ball-bearing; Fig. 6, a cross section of same; Fig. 7, a side view disclosing a plurality of spring-actuated positions of the fins; Fig. 8, a total front view of the device; Fig. 9, a front view of a fin with spring; Fig. 10, a plan view of the elastic center of fin springs; Fig. 15 is a plan view of the spring-actuated arrangement of the fins; Figs. 12, 13, and 14 are various views of the fin springs; Fig. 15 is a plan view of the shock-absorbing center of the fin; Fig. 16, a total front view of the double bearing; Fig. 17, a front view of the fin bearings; and Fig. 18, a section of the double bearings.

Referring to the drawings, the fins 1 and two fin holders 2 are secured to the sleeve 3, 4 (Fig. 3, front view) surrounding the leg above the ankle. Between the fin holder 2 and the sleeve 3, 4 a plate 6 made of suitable material and adapted to be turned up is secured to a riveted hinge 5. Attached to this plate is a bearing bracket 7 to the sides of which the fin holder with the fin and two bearings is secured so that they can easily swing up and down. By means of several springs 9 attached to the hinge pin 8 the plate 6 is always kept in a hanging down position while closely hugging the sleeve, as shown in Figs. 1 and 2.

During the swimming-stroke the fins 1 and the fin holder 2 expand horizontally and remain in this position during the stroke owing to the elastic arrangement of the fin holder 2 relative to the sleeve 3, 4 (Fig. 3). Should it happen during a swimming stroke and while the fins are in extended position that the edge of a fin accidentally strikes the other leg, the fin, yielding to the impact, will swing upwardly, i. e., the hinge plate 6 with the fin attached to it and the extensions of the springs 9 will execute a turning movement in the hinge, but drop down again after the impact has ceased, Fig. 4.

Between the hinge plate 6 and both sides of the back of the bracket 7 a small double ball-bearing 10 with intermediate plate 11, pin 12, a compression spring 13, and a coil spring 14 are inserted, the compression spring 13 being of the cylindrical or flat type. The pin 12 is secured to the hinge plate 6 either by a means of a firmly pressed-on ring or by riveting, Fig. 6. To the pin 12 the bracket 7 with its fin holder 2, the fin and coil springs 14, and the ball bearing 10 is screwed while tightening the compression spring 13, the coil spring 14 keeping the fin continually in an elastic middle position. (Figs. 5 and 6.)

If the front or rear edge of the turned down fin 1 accidentally meets a resistance while its wearer sits or walks on the beach or swims, the fin will turn from its middle position to the front or rear, as indicated by the dotted lines in Fig. 7, about the pin 12 of the double ball bearing until it swings back into its elastically adjustable middle position owing to the coil spring 14.

Between the walls of the fin holder 2 and the bracket 7 one small coil spring 15 is arranged around each bearing so that one end of the spring fits into the fin holder 2 and the other into the bracket 7. The springs are so adjusted that the fin is kept down under slightest pressure without touching the foot laterally when the wearer walks (Figs. 8, 9, 10). Should it come to an accidental impact during walking, the fins will yield to it by swinging in or out.

Instead of securing the fin 1 to the fin holder 2 by means of riveting several cylindrical compression springs 16 are placed between the fin and its holder. These springs are arranged in the spoon-shaped elevation of the fin and press it elastically against the holder while 2 springs attached to the edge of the fin press against the inwardly bent lobe of the holder, both from the inside and the outside, and elastically maintain a certain distance between the edge of the fin and the fin holder. The springs 16 are held in position by means of thin wire webs provided with edge and eye (Figs. 11 and 12). Should an accidental impact take place relative to the fin during walking or swimming, the shock will be absorbed and the fin yield to the resistance. (Figs. 13, 14, 15.)

Figure 18:
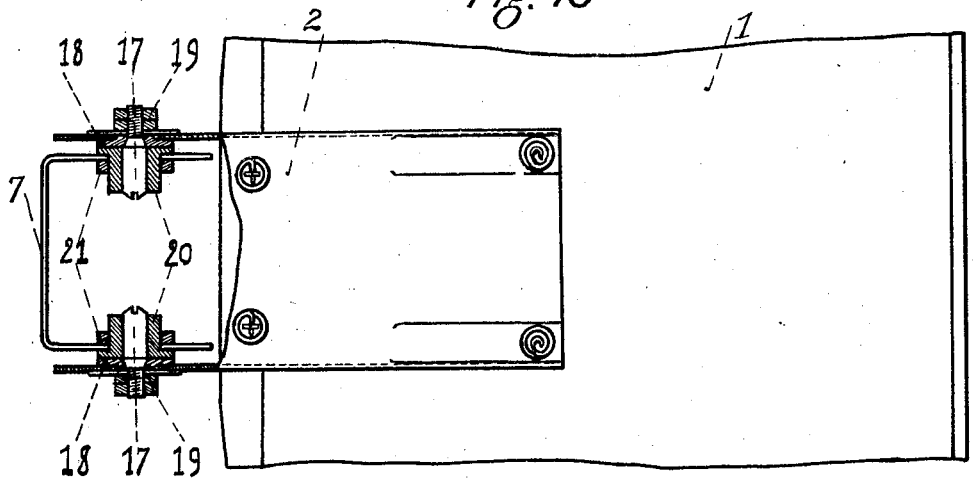

The swinging arrangement of the fin holder 2 with the fin 1 relative to the bracket 7 takes place by means of two bearings. In order to provide a highly resistant arrangement of the extremely elastic yet stable and efficient fins, which are of minimum weight, it has been found advisable to choose an ample distance for the oppositely placed bearings to insure sufficient strength for the latter under stress. (Figs. 17, 18.) To be well secured to the side wall of the fin holder the journals 17 require shoulders of sufficient width, but as, in this construction, they have to be passed through the bearings without shoulder, a plate 18 having a conical bore is provided into which the journal 17 is placed firmly secured to the thin wall of the fin holder 2 by means of the double nuts 19. The cylindrical part of the journals 17 rests in the bushes 20 which are simply yet effectively attached to both sides of the bracket 7 by means of the ring 21. Fig. 16 shows a total view of this arrangement. All parts used in this arranagement are made from the lightest, strongest, rust-proof materials best suited for the purpose.

Figure 19:
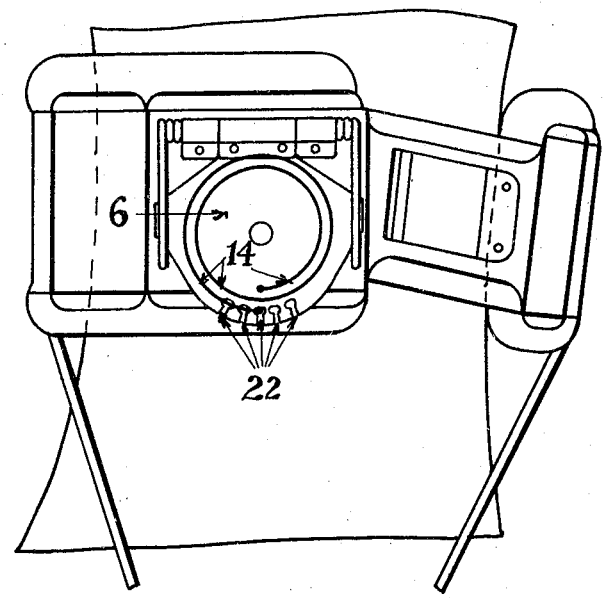
Figure 20:
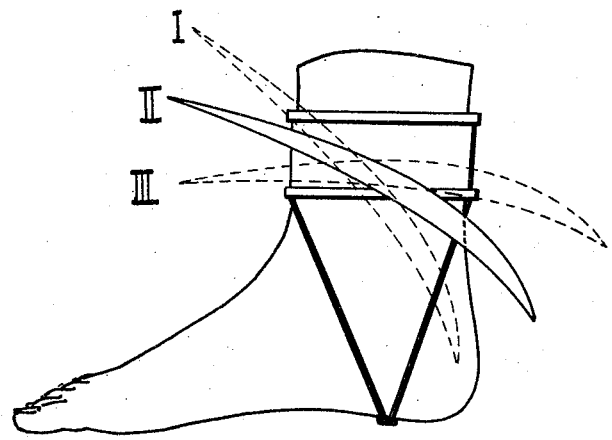

Each of the two ends of the coil spring 14 engages one of the holes of the hinge plate 6 and the bearing racket 7 (Fig. 19) and thus imparts to the fin secured to the bracket 7 an invariable angular position. In order to enable untrained, trained, and perfect swimmers to make use of the fins according to their needs, the angular position of the fins, which is invariable during swimming, must be variable (Fig. 20). For this purpose a plurality of slots 22 (Fig. 19) is provided on both sides of the bores of the hinge plate 6 so that the spring 14 may engage a slot to the right or left of the bore responsible for the original angular position of the fin and thus bring about a different invariable adjustment of the angular position of the fins. By a very oblique arrangement (position I) the upward propelling force relative to the legs of untrained swimmers will be increased at the expense of the forward propelling force, while position III represents highest efficiency for a perfect swimmer, owing to the position of the fins, which is almost at right angles to the middle line of the leg. The slots to be engaged by the spring are arranged so that the first slot controls the most inclined position of the fin and the last slot, the almost rectangular position. The slots of the right and left hand fins are numbered uniformly to insure the correct adjustment of both fins in case of a change in the angular position.

I claim:—

1. A device for preventing the breaking of fins in swimming shoes fitted with spoon-shaped fins hinged to a sleeve surrounding the ankle-joint, comprising in combination and operative connection a fin holder, a bearing, a bearing bracket, and a spring hinge of suitable material to protect the extended fin against breakage due to vertical impact, the fin being turned up above its normal working position in case of an accidental impact and returned to its original position after the impact has ceased.

2. In a device for preventing the breaking of fins in swimming shoes according to claim 1 a small double bearing and a coil spring arranged between the spring hinge and bracket for protecting the fins against breakage due to impacts from the front and rear, the said fins being adapted to yield to accidental impacts by swinging about the shaft of the said ball bearing and thereupon returning elastically to their central position.

3. In a device for preventing the breaking of fins in swimming shoes according to claim 1 a plurality of coil springs of suitable material for protecting the fins, while in non-working position, against breakage due to accidental lateral internal and external impacts, the said fins being held down under slight pressure and yield towards both sides within elastic limits.

4. In a device for preventing the breaking of fins in swimming shoes according to claim 1 a plurality of springs and spring bolts of suitable material attached to the fin holder to provide spring-actuated connections for the fins both in working and non-working position and to protect the latter against breakage due to lateral impact in either position, the said fin holders being recessed to protect the heads of the said springs and bolts.

5. In a device for preventing the breaking of fins in swimming shoes according to claim 1 shoulderless journals of suitable material provided with a cone, conically bored plates for receiving the said journals, nuts for fastening the same, and rings for connecting the bearings with the brackets.

6. In a device for preventing the breaking of fins in swimming shoes according to claim 1 a coil spring and a hinged plate provided with a plurality of slots adapted to engage the bent ends of the said spring.

HANS BECKERT.